US011682067B2

(12) United States Patent
Yeh et al.

(10) Patent No.: US 11,682,067 B2
(45) Date of Patent: *Jun. 20, 2023

(54) SYSTEMS AND METHODS FOR VIRTUAL APPLICATION OF COSMETIC PRODUCTS BASED ON FACIAL IDENTIFICATION AND CORRESPONDING MAKEUP INFORMATION

(71) Applicant: Perfect Mobile Corp., New Taipei (TW)

(72) Inventors: Chun Ming (Jimmy) Yeh, Taipei (TW); Chia Yu (Nick) Tung (Dong), New Taipei (TW)

(73) Assignee: PERFECT MOBILE CORP., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,731

(22) Filed: Jan. 13, 2022

(65) Prior Publication Data
US 2022/0138836 A1 May 5, 2022

Related U.S. Application Data

(62) Division of application No. 16/186,853, filed on Nov. 12, 2018, now Pat. No. 11,257,142.
(Continued)

(51) Int. Cl.
*G06Q 30/00* (2023.01)
*G06Q 30/0601* (2023.01)
(Continued)

(52) U.S. Cl.
CPC ..... *G06Q 30/0641* (2013.01); *G06F 3/04842* (2013.01); *G06T 11/60* (2013.01); *G06V 40/161* (2022.01)

(58) Field of Classification Search
CPC .............. G06Q 30/0641; G06V 40/161; G06F 3/04842; G06T 11/60
(Continued)

(56) References Cited

U.S. PATENT DOCUMENTS 7,079,158 B2  7/2006  Lambertsen
7,634,103 B2  12/2009  Rubinstenn et al.
(Continued)

FOREIGN PATENT DOCUMENTS

CN   105447125 A   3/2016
CN   106952143 A   7/2017
(Continued)

OTHER PUBLICATIONS

Wagic Mirror Technologies and Latest Development, https7/www.magicmirror.me/Products/Photobooth-Technologies (printed Nov. 8, 2018).
(Continued)

*Primary Examiner* — Anand Loharikar
(74) *Attorney, Agent, or Firm* — McClure, Qualey & Rodack, LLP

(57) ABSTRACT

A client device obtains a request from a user to retrieve makeup information from a cloud server and obtains a digital image of a facial region of the user. The client device transmits the digital image to initiate a communication session with the cloud server without obtaining login credentials from the user, wherein the cloud server retrieves a makeup session packet by matching the transmitted digital image with one of a plurality of digital images in the cloud server and transmits the makeup session packet comprising a corresponding selection of cosmetic products. The client device receives the makeup session packet and extracts the selection of cosmetic products by the client device and generates a user interface displaying the selection of cos-
(Continued)

metic products. The client device performs virtual application of the selection of cosmetic products onto the facial region of the user.

12 Claims, 3 Drawing Sheets

Related U.S. Application Data

(60) Provisional application No. 62/733,118, filed on Sep. 19, 2018.

(51) Int. Cl.
  *G06F 3/04842* (2022.01)
  *G06T 11/60* (2006.01)
  *G06V 40/16* (2022.01)

(58) Field of Classification Search
  USPC .............................................. 705/26.1–27.2
  See application file for complete search history.

(56) References Cited

U.S. PATENT DOCUMENTS

| | | | |
|---|---|---|---|
| 9,058,765 | B1 | 6/2015 | Mallick et al. |
| 9,674,485 | B1 | 6/2017 | Sugaya |
| 9,760,935 | B2 | 9/2017 | Aarabi |
| 9,961,984 | B2 | 5/2018 | Witchell et al. |
| 10,028,569 | B2 | 7/2018 | Yamanashi et al. |
| 2012/0044335 | A1 | 2/2012 | Goto |
| 2013/0159895 | A1 | 6/2013 | Aarabi |
| 2014/0210814 | A1 | 7/2014 | Kim et al. |
| 2015/0253873 | A1 | 9/2015 | Sato et al. |
| 2015/0339757 | A1* | 11/2015 | Aarabi ............... G06Q 30/0631 705/26.7 |
| 2015/0356661 | A1 | 12/2015 | Rousay |
| 2016/0328632 | A1 | 11/2016 | Choe et al. |
| 2016/0357578 | A1 | 12/2016 | Kim et al. |
| 2017/0024589 | A1 | 1/2017 | Schumacher et al. |
| 2017/0255478 | A1 | 9/2017 | Chou et al. |
| 2018/0075523 | A1* | 3/2018 | Sartori Odizzio . G06Q 30/0643 |
| 2018/0075524 | A1 | 3/2018 | Sartori Odizzio et al. |

FOREIGN PATENT DOCUMENTS

| | | |
|---|---|---|
| CN | 107154091 A | 9/2017 |
| EP | 3 260 994 A1 | 12/2017 |
| JP | 2002123585 A | 4/2002 |
| KR | 2003023892 A | 3/2003 |
| WO | 2016001248 A1 | 1/2016 |
| WO | 2018005884 A1 | 1/2018 |

OTHER PUBLICATIONS

Sephora Virtual Artist, https://sephoravirtualartist.com/landing_5.0.php?country=US&lang=en&x=&skintone=&currentModel= (printed Nov. 8, 2018).

How to Use Our MakeupGenius App, https://www.lorealparisusa.com/beauty-magazine/makeup/makeup-looks/makeupgenius-changes-makeup-application-forever.aspx?ptm_medium=onespot&otm_source=onsite&otm_content=beauty-magazine-article-page:beauty-magazine-article-page-footer&otm_click_id=d8082209—(printed Nov. 8, 2018).

We create augmented reality tech for beauty brands, http://modiface.com/ (printed Nov. 8, 2018).

Shiseido's New "TeleBeauty" App , A Virtual Makeup Solution for Online Meetings, https://www.shiseidogroup.com/news/detail.html?n=00000000002041. Oct. 7, 2016.

Shadescout, https://play.google.com/store/apps/details?id=air.com.facecake.shadescoutmakeup&hl=en_US (printed Nov. 8, 2018).

European Search Report dated Jul. 29, 2019, issued in application No. EP 19153360.3.

European Office Action dated Jan. 21, 2021, issued in application EP 19 153 360.3.

* cited by examiner

SYSTEMS AND METHODS FOR VIRTUAL APPLICATION OF COSMETIC PRODUCTS BASED ON FACIAL IDENTIFICATION AND CORRESPONDING MAKEUP INFORMATION

CROSS-REFERENCE TO RELATED APPLICATION

This application is a Divisional of pending U.S. patent application Ser. No. 16/186,853, filed on Nov. 12, 2018, which claims priority to, and the benefit of, U.S. Provisional Patent Application entitled, "Face combined with makeup information system," having Ser. No. 62/733,118, filed on Sep. 19, 2018, which is incorporated by reference in its entirety.

TECHNICAL FIELD

The present disclosure generally relates to virtual application of cosmetic effects and more particularly, to systems and methods for performing virtual application of cosmetic products based on facial identification and corresponding makeup information.

BACKGROUND

Although individuals invest a substantial amount of money in makeup tools and accessories, it can be a challenge to achieve the same results as a makeup professional. In retail establishments, professional beauty advisors commonly assist individuals with recommending cosmetic products to achieve a desired look. However, due to the volume of consumers seeking makeup consultation at times, the availability of beauty advisors may be limited. Although some retail establishments offer the use of electronic kiosks that allow customers to evaluate cosmetic products, it can be difficult for customers to retain makeup information given the number of cosmetic products that a customer may try on during a particular session. Furthermore, some customers may not wish to go through the tedious process of setting up an account at the electronic kiosk for purposes of tracking makeup information. Therefore, there is a need for allowing consumers to efficiently evaluate and track information on cosmetic products for purposes of later purchasing products, participating in a makeup consultation, and so on.

SUMMARY

In accordance with one embodiment, a client device obtains a request from a user to retrieve makeup information from a cloud server. The client device obtains a digital image of a facial region of the user and transmits the digital image to initiate a communication session with the cloud server without obtaining login credentials from the user, wherein the cloud server retrieves a makeup session packet by matching the transmitted digital image with one of a plurality of digital images in the cloud server and transmits the makeup session packet comprising a corresponding selection of cosmetic products. The client device receives the makeup session packet and extracts the selection of cosmetic products. The client device generates a user interface displaying the selection of cosmetic products and performs virtual application of the selection of cosmetic products onto the facial region of the user.

Another embodiment is a system that comprises a memory storing instructions and a processor coupled to the memory. The processor is configured by the instructions to obtain a request from a user to retrieve makeup information from a cloud server. The processor is further configured to obtain a digital image of a facial region of the user and transmit the digital image to initiate a communication session with the cloud server without obtaining login credentials from the user, wherein the cloud server retrieves a makeup session packet by matching the transmitted digital image with one of a plurality of digital images in the cloud server and transmits the makeup session packet comprising a corresponding selection of cosmetic products. The processor is further configured to receive the makeup session packet and extracting the selection of cosmetic products and generate a user interface displaying the selection of cosmetic products. The processor is further configured to perform virtual application of the selection of cosmetic products onto the facial region of the user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Various embodiments are disclosed for allowing individuals to receive and evaluate makeup product recommendations, where the individuals are able to later retrieve information relating to makeup products of interest through the use of a digital image, where such information may be utilized, for example, to purchase makeup products or to participate in a makeup consultation session with an available makeup professional. Notably, various embodiments are disclosed that do not require the use of login credentials (e.g., username and password), thereby allowing individuals to access information stored in the cloud without having to submit such information as contact information, e-mail address, and so on that individuals may not wish to share.

Figure 1:
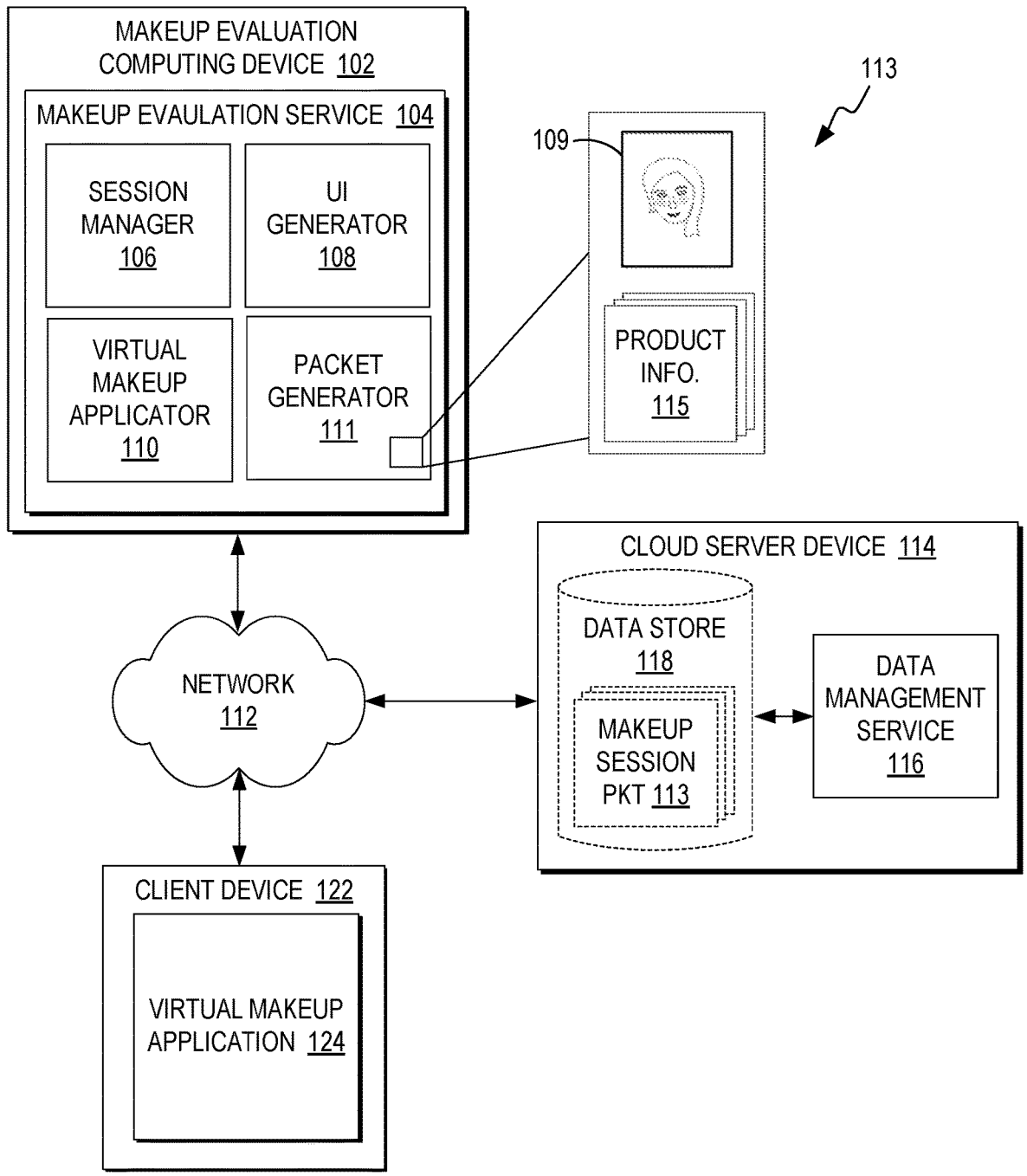
FIG. 1 is a block diagram of a networked environment for performing virtual application of cosmetic products based on facial identification and corresponding makeup information according to various embodiments of the present disclosure.

A description of a system for performing virtual application of cosmetic products based on facial identification and corresponding makeup information is now described followed by a discussion of the operation of the components within the system. FIG. 1 is a block diagram of a networked environment that includes a makeup evaluation computing device 102, a cloud server device 114, and a client device 122. The makeup evaluation computing device 102, cloud server device 114, and the client device 122 are communicatively coupled via a network 112 such as, for example, the Internet, intranets, extranets, wide area networks (WANs), local area networks (LANs), wired networks, wireless networks, or other suitable networks, etc., or any combination of two or more such networks.

Both the makeup evaluation computing device 102 and the client device 122 may be embodied as a computing device such as, but not limited to, a smartphone, a tablet computing device, a laptop, and so on. The cloud server device 114 may comprise a server computer or any other system providing computing capability. Alternatively, the cloud server device 114 may employ a plurality of computing devices that can be arranged, for example, in one or more server banks, computer banks or other arrangements. Such computing devices can be located in a single installation or can be distributed among different geographical locations.

The makeup evaluation computing device 102 may be installed in a retail establishment and is utilized by a user to receive and evaluate makeup product recommendations generated by the makeup evaluation computing device 102. A makeup evaluation service 104 executes on a processor of the makeup evaluation computing device 102 thereby causing the makeup evaluation computing device 102 to perform the operations/functions for implementing the features disclosed herein. The makeup evaluation service 104 includes a session manager 106, a user interface (UI) generator 108, a virtual makeup applicator 110, and a packet generator 111.

The session manager 106 is configured to obtain a request from a user to initiate a makeup evaluation session. The session manager 106 initiates the makeup evaluation session without obtaining login credentials from the user. Rather than utilizing traditional login credentials (e.g., username and password) to initiate the makeup session, the session manager 106 obtains a digital image of a facial region of the user and utilizes the digital image to initiate the makeup evaluation session. One advantage of bypassing the use of login credentials is that the user does not have to spend time setting up an account on the makeup evaluation computing device 102 to access content on the cloud server device 114. Furthermore, the user does not have to submit such information as contact information, e-mail address, and so on that individuals may wish to keep private.

As one of ordinary skill will appreciate, the digital image may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the digital image may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The UI generator 108 is configured to generate a user interface displaying one or more cosmetic products. The UI generator 108 obtains from the user a selection of cosmetic products among the one or more displayed cosmetic products. The virtual makeup applicator 110 is configured to perform virtual application of the selected cosmetic products on the facial region of the user, thereby allowing the user to evaluate the application of the selected cosmetic products. The packet generator 111 is configured to generate a makeup session packet 113 comprising the digital image 109 of the facial region of the user and the stored selection of cosmetic products 115. The packet generator 111 transmits the makeup session packet 113 to the cloud server device 114. A data management service 116 executes on a processor of the cloud server device 114 and stores the makeup session packet 113 in a data store 118.

A virtual makeup application 124 executes on a processor of the client device 122 thereby causing the client device 122 to perform the operations/functions for implementing the features disclosed herein. The virtual makeup applicator 124 is configured to obtain a request from a user to retrieve makeup information from the cloud server device 114. The virtual makeup application 124 initiates a communication session with the cloud server device 114 without obtaining login credentials from the user. As discussed above, one advantage of bypassing the use of login credentials is that the user does not have to spend time setting up an account to access content on the cloud server device 114. Furthermore, the user does not have to submit such information as contact information, e-mail address, and so on that individuals may wish to keep private.

The virtual makeup application 124 obtains a digital image of a facial region of the user and transmits the digital image to the cloud server device 114, wherein the cloud server device 114 retrieves a makeup session packet 113 comprising a matching digital image of the facial region of the user and a corresponding selection of cosmetic products. The cloud server device 114 sends the makeup session packet 113 to the client device 122, and the virtual makeup application 124 generates a user interface displaying the selection of cosmetic products specified in the makeup session packet 113. The virtual makeup application 124 performs virtual application of the selection of cosmetic products onto the facial region of the user.

Figure 2:
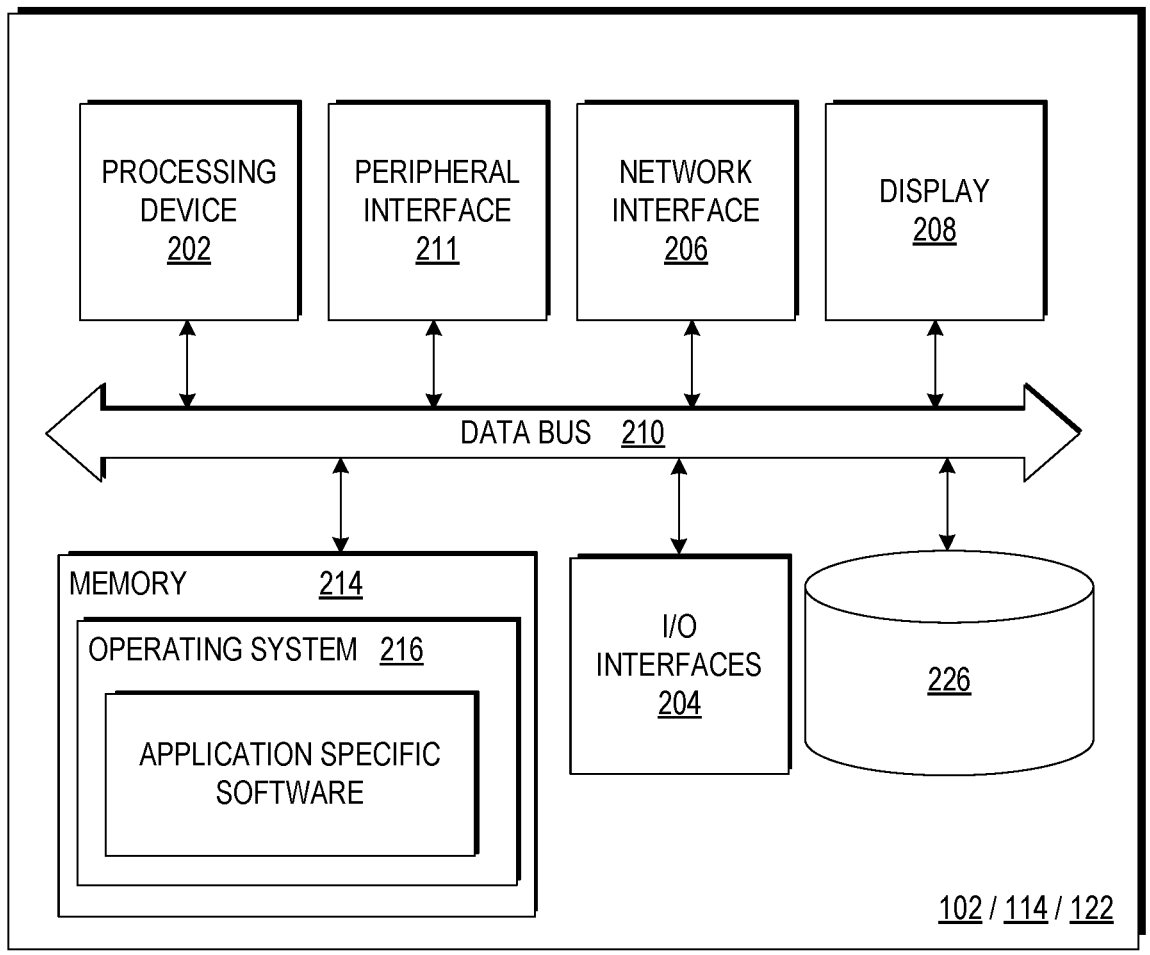
FIG. 2 is a schematic diagram of the devices in FIG. 1 according to various embodiments of the present disclosure.

FIG. 2 illustrates a schematic block diagram for each of the makeup evaluation computing device 102, the cloud server device 114, and the client device 122 in FIG. 1. Each of these computing devices 102, 114, 122 may be embodied in any one of a wide variety of wired and/or wireless computing devices, such as a desktop computer, portable computer, dedicated server computer, multiprocessor computing device, smart phone, tablet, and so forth. As shown in FIG. 2, each of these computing devices 102, 114, 122 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing devices 102, 114, 122 depicted in FIG. 1. In accordance with such embodiments, the components are stored in memory 214 and executed by the processing device 202, thereby causing the processing device 202 to perform the operations/functions relating to the features disclosed herein. One of ordinary skill in the art will appreciate that the memory 214 can, and typically will, comprise other components which have been omitted for purposes of brevity. For some embodiments, the components in the computing devices 102, 114, 122 may be implemented by hardware and/or software.

Input/output interfaces 204 provide any number of interfaces for the input and output of data. For example, where the computing device comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
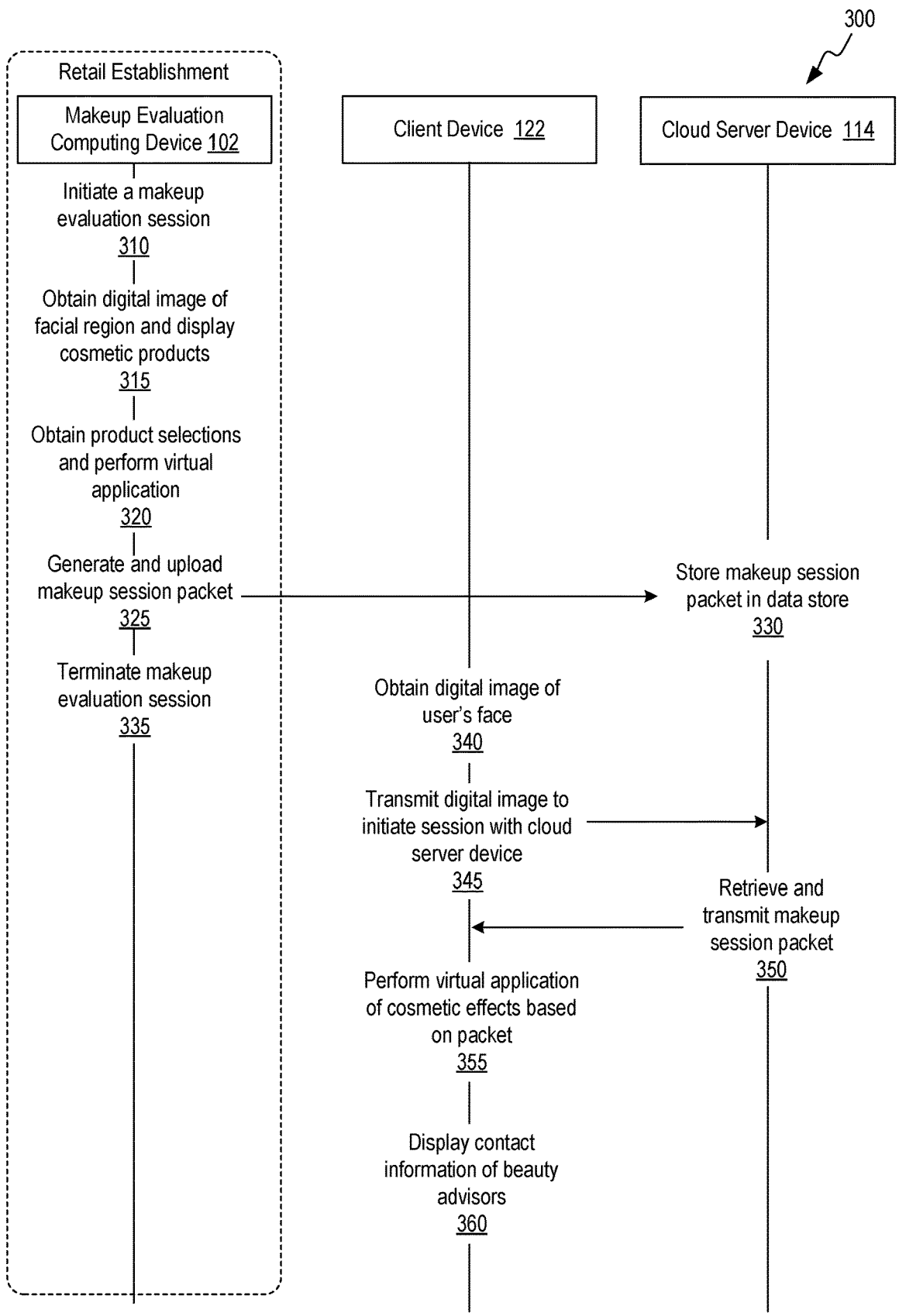
FIG. 3 is a top-level flowchart illustrating examples of functionality implemented as portions of the devices in FIG. 1 for performing virtual application of cosmetic products based on facial identification and corresponding makeup information according to various embodiments of the present disclosure.

Reference is made to FIG. 3, which is a flowchart 300 that shows the interaction between the various components in the networked environment of FIG. 1 for performing virtual application of cosmetic products based on facial identification and corresponding makeup information. It is understood that the flowchart 300 of FIG. 3 provides merely an example of the different types of functional arrangements that may be employed to implement the operation of the various components of the computing devices 102, 114, 122 depicted in FIG. 1. As an alternative, the flowchart 300 of FIG. 3 may be viewed as depicting an example of steps of a method implemented in the computing devices 102, 114, 122 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the makeup evaluation computing device 102 initiates a makeup evaluation session based on input from a user. For some embodiments, the makeup evaluation computing device 102 may be installed in a retail establishment. At block 315, the makeup evaluation computing device 102 obtains a digital image of the facial region of the user and provides cosmetic products. For some embodiments, the cosmetic products are displayed on a user interface generated by the makeup evaluation computing device 102, where the cosmetic products may be displayed based on facial features and attributes depicted in the digital image. At block 320, the makeup evaluation computing device 102 obtains selections of one or more of the cosmetic products and performs virtual application of the selected cosmetic products onto the digital image of the user.

At block 325, the makeup evaluation computing device 102 generates a makeup session packet 113 (FIG. 1) by bundling the digital image with the cosmetic products selected by the user. Other information such as price, ingredients, manufacturing location, usage about the cosmetic products, and so on may also be bundled into the makeup session packet. The makeup evaluation computing device 102 then uploads the makeup session packet to the cloud server device 114. At block 330, the cloud server device 114 stores the makeup session packet 113 in a data store 118 (FIG. 1).

At block 335, the makeup evaluation computing device 102 terminates the makeup evaluation session. The termination process may comprise deleting the digital image of the user and the stored selection of cosmetic products selected by the user from a local storage of the makeup evaluation computing device 102. In this regard, the digital image and the selection of cosmetic products are only stored temporarily by the makeup evaluation computing device 102.

Later, the user may wish to retrieve information relating to the cosmetic products selected earlier by the user while visiting the retail establishment. In exemplary embodiments, the user accesses this information using a client device 122 such as the user's smartphone, laptop, or other computing device communicatively coupled to the cloud server device 114. At block 340, the client device 122 obtains a digital image of the facial region of the user. At block 345, the client device 122 transmits the digital image to the cloud server device 114 to initiate a communication session with the cloud server device 114. Note that the client device 122 initiates the communication session without the use of any kind of login credentials (e.g., username and password) associated with the user.

At block 350, the cloud server device 114 analyzes the digital image uploaded by the client device 122 and searches the data store 118 and compares the uploaded digital image to digital images in each of the makeup session packets 113 in the data store 118. The cloud server device 114 retrieves a closest matching digital image in the data store 118 and transmits the corresponding makeup session packet 113 to the client device 122.

At block 355, the client device 122 parses the makeup session packet 113 downloaded from the cloud server device 114 and obtains the cosmetic products embedded in the makeup session packet 113. For some embodiments, the client device 122 generates a user interface that displays a listing of the cosmetic products in the order they were selected earlier by the user using the makeup evaluation computing device 102 at the retail establishment. The client device 122 performs virtual application of the cosmetic products obtained from the downloaded the makeup session packet 113.

For some embodiments, the client device 122 may also determining a grouping of beauty advisors currently online and display a listing of beauty advisors based on the cosmetic products specified in the makeup session packet 113 downloaded from the cloud server device 114. Specifically, the client device 122 may be configured to retrieve profile information for each of the online beauty advisors and identify beauty advisors who have prior experience working with one or more of the cosmetic products specified in the makeup session packet 113. The client device 122 displays a list of suitable beauty advisors to the user (block 360).

The user may then initiate a makeup consultation session with a beauty advisor to receive further cosmetic products or to further refine application of the cosmetic products previously selected by the user. For some embodiments, the user may be prompted to enter login credentials by the client device 122 in order to provide the beauty advisor with relevant information about the user for purposes of facilitating the makeup consultation session. Additional cosmetic products and refinement of the previously selected cosmetic products made during the makeup consultation session may then be stored in connection with the user's login credentials. Thereafter, the process in FIG. 3 ends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A computer-implemented method, comprising:
obtaining a request from a user to initiate a makeup evaluation session;
initiating the makeup evaluation session without obtaining login credentials comprising typed input from the user;
obtaining a digital image of a facial region of the user;
generating a user interface displaying at least one cosmetic product;
obtaining from the user a selection of cosmetic products among the at least one displayed cosmetic product;
performing virtual application of the selected cosmetic products on the facial region of the user;
generating a makeup session packet comprising the digital image of the facial region of the user and embedding the stored selection of cosmetic products into the makeup session packet;
transmitting the makeup session packet to a cloud server;
terminating the makeup evaluation session;
obtaining a request from the user to retrieve makeup information from the cloud server;
obtaining a second digital image of the facial region of the user;
transmitting the second digital image to initiate a communication session with the cloud server without obtaining login credentials from the user, wherein the cloud server retrieves a makeup session packet by performing facial recognition and matching the transmitted second digital image with one of a plurality of digital images in the cloud server and transmits the makeup session packet comprising a corresponding selection of cosmetic products;
receiving the makeup session packet and extracting the selection of cosmetic products;
generating a user interface displaying the selection of cosmetic products; and
performing virtual application of the selection of cosmetic products onto the facial region of the user.

2. The method of claim 1, further comprising:
determining a grouping of beauty advisors currently online;
generating a subset of beauty advisors from the grouping based on the selection of cosmetic products;
displaying the subset of beauty advisors in the user interface;
obtaining a selection from the user of the of the beauty advisors; and
establishing a makeup consultation session between the client device and a device of the selected beauty advisor.

3. The method of claim 2, wherein generating the subset of beauty advisors from the grouping based on the selection of cosmetic products comprises:
retrieving profile information for each of the grouping of beauty advisors; and
identifying beauty advisors within the grouping of beauty advisors with prior experience applying at least one of the selection of cosmetic products based on the profile information.

4. The method of claim 2, wherein establishing the makeup consultation session between the client device and a device of the selected beauty advisor comprises:
obtaining login credentials from the user; and
establishing the makeup consultation session between the client device and a device of the selected beauty advisor based on the login credentials.

5. The method of claim 1, wherein the selection of cosmetic products are displayed in a same order in which the user previously evaluated the cosmetic products at a retail establishment using a makeup evaluation computing device installed in the retail establishment.

6. The method of claim 1, further comprising displaying in the user interface an ordered listing of a sequence of cosmetic products selected by the user of the client device.

7. A system, comprising:
a memory storing instructions;
a processor coupled to the memory and configured by the instructions to at least:
obtain a request from a user to initiate a makeup evaluation session;
initiate the makeup evaluation session without obtaining login credentials comprising typed input from the user;
obtain a digital image of a facial region of the user;
generate a user interface displaying at least one cosmetic product;
obtain from the user a selection of cosmetic products among the at least one displayed cosmetic product;
perform virtual application of the selected cosmetic products on the facial region of the user;
generate a makeup session packet comprising the digital image of the facial region of the user and embedding the stored selection of cosmetic products into the makeup session packet;
transmit the makeup session packet to a cloud server;
terminate the makeup evaluation session;

obtain a request from the user to retrieve makeup information from the cloud server;

obtain a second digital image of a facial region of the user;

transmit the second digital image to initiate a communication session with the cloud server without obtaining login credentials from the user, wherein the cloud server retrieves a makeup session packet by performing facial recognition and matching the transmitted second digital image with one of a plurality of digital images in the cloud server and transmits the makeup session packet comprising a corresponding selection of cosmetic products;

receive the makeup session packet and extract the selection of cosmetic products;

generate a user interface displaying the selection of cosmetic products; and perform virtual application of the selection of cosmetic products onto the facial region of the user.

8. The system of claim 7, wherein the processor is further configured to:

determine a grouping of beauty advisors currently online;

generate a subset of beauty advisors from the grouping based on the selection of cosmetic products;

display the subset of beauty advisors in the user interface;

obtain a selection from the user of the of the beauty advisors; and establish a makeup consultation session with a device of the selected beauty advisor.

9. The system of claim 8, wherein the processor generates the subset of beauty advisors from the grouping based on the selection of cosmetic products by performing the steps of:

retrieving profile information for each of the grouping of beauty advisors; and identifying beauty advisors within the grouping of beauty advisors with prior experience applying at least one of the selection of cosmetic products based on the profile information.

10. The system of claim 8, wherein the processor establishes the makeup consultation session with the device of the selected beauty advisor by performing the steps of:

obtaining login credentials from the user; and establishing the makeup consultation session with the device of the selected beauty advisor based on the login credentials.

11. The system of claim 7, wherein the selection of cosmetic products are displayed in a same order in which the user previously evaluated the cosmetic products at a retail establishment using a makeup evaluation computing device installed in the retail establishment.

12. The system of claim 7, wherein the processor is further configured to display in the user interface an ordered listing of a sequence of cosmetic products selected by the user of the system.

* * * * *